Oct. 27, 1925.
R. KENNINGTON ET AL
ANIMAL CARRIER
Filed April 13, 1925
1,558,892
FIG. I.
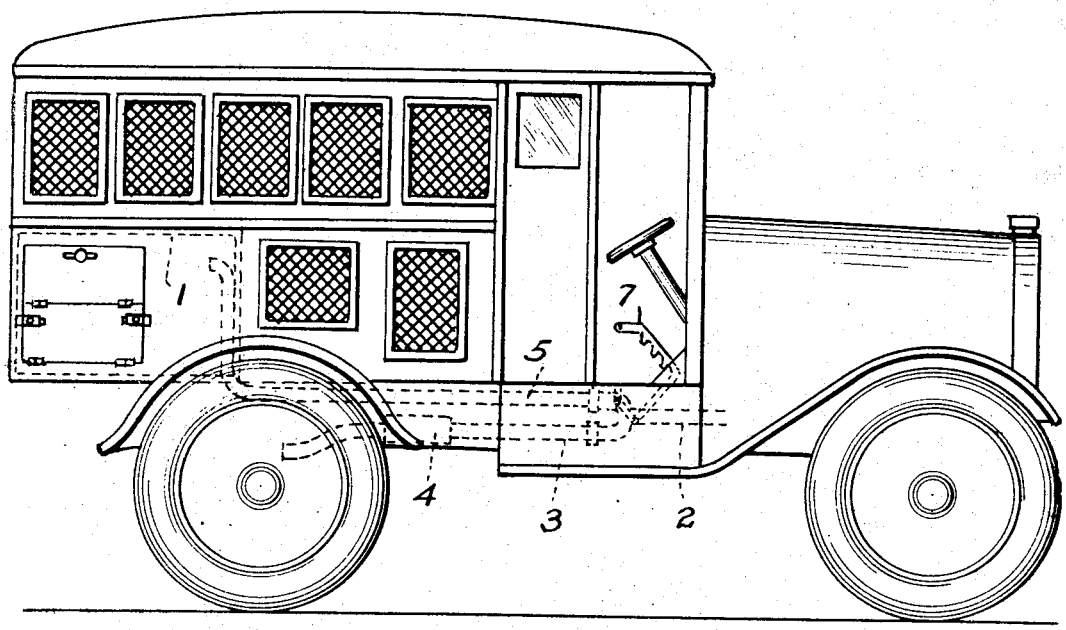
FIG. II.
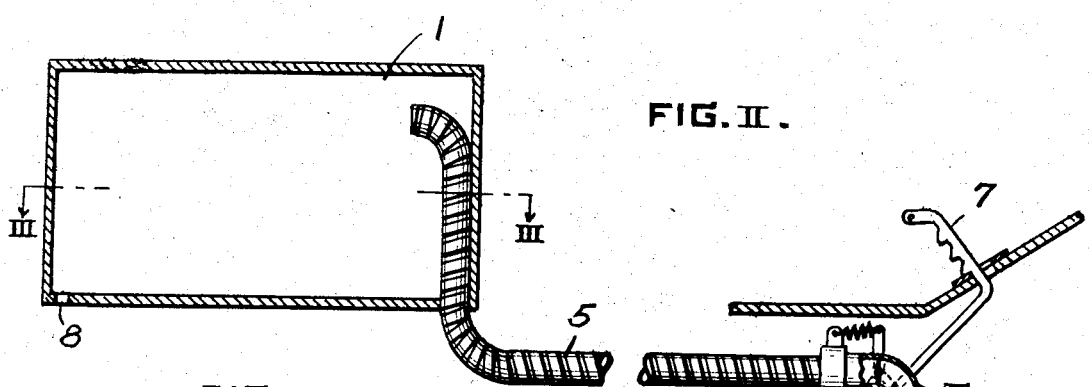
FIG. III.
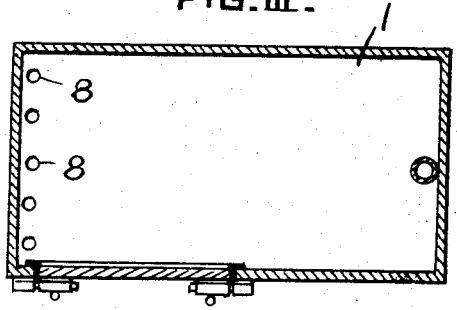
WITNESSES
J. Holch Bradley
Percy a English
INVENTORS
Robert Kennington
Robert S. Shearn
by Christy and Christy
their attorneys Patented Oct. 27, 1925.

1,558,892

UNITED STATES PATENT OFFICE.

ROBERT KENNINGTON AND ROBERT S. SHEARN, OF PITTSBURGH, PENNSYLVANIA.

ANIMAL CARRIER.

Application filed April 13, 1925. Serial No. 22,543.

*To all whom it may concern:*

Be it known that we, ROBERT KENNINGTON and ROBERT S. SHEARN, residing at Pittsburgh, in the county of Allegheny and State of Pennsylvania, citizens of the United States, have invented or discovered certain new and useful Improvements in Animal Carriers, of which improvements the following is a specification.

Our invention consists in an attachment to or an associate part for an internal combustion engine; it finds practical application in the motor vehicles used by municipal authorities, humane societies, and other agencies, for carrying vagrant, diseased, and injured animals, and in that application we shall describe it.

Fig. I is a view in side elevation of a vehicle of the sort alluded to, having our invention applied to it. Fig. II is a fragmentary view to larger scale, and in vertical section, showing more minutely this application of the invention. Fig. III is a view in horizontal section of the chamber or cell to which our invention is immediately applied and combined with which it becomes complete. The plane of section is in Fig. II indicated at III—III.

Vehicles used for the purposes we have indicated are provided with one or more chambers or cells into which animals are introduced, to be carried away and disposed of. And in the drawings we show such a chamber or cell, designated by the numeral 1. It is provided, as shown in Fig. I, with a door or doors, through which the animals may be introduced and removed. It is common that animals so taken possession of and carried away have to be killed and the killing often becomes a difficult, or even a dangerous matter.

Our invention consists in making this chamber relatively air-tight when closed, and in leading into it the spent gases from the engine which drives the vehicle. These gases consist largely of carbon dioxide and carbon monoxide, one of which is incapable of sustaining animal life, and the other is an efficacious and painless destroyer of animal life. By this provision we are able to put an end to a stray or diseased dog or cat in a moment or two, safely and humanely.

In the drawings 2 is the exhaust pipe leading from the engine. This pipe branches; branch 3 leading to the usual muffle 4, branch 5 leading to chamber 1. In branch 5 is arranged a normally closed valve 6, and means are provided for opening this valve at will. Such means here are found in a pedal 7, adapted to be pressed by the driver of the car.

The branch pipe 5 opens preferably in the upper part of chamber 1, while openings 8 are formed through the floor of the chamber.

Operation is manifest. When, for example, a dog infected with rabies has been introduced into the chamber and the door has been closed, the driver runs the car to the place where the animal is to be disposed of. On the way he presses pedal 7, and in so doing opens valve 6. The spent gases from the engine then stream into chamber 1 and driving out the air, fill the chamber. In this atmosphere the animal succumbs painlessly, and in two minutes' time is dead. The valve 6 may be allowed to remain open, or may soon be closed again. The chamber 1 is itself a muffle for so much of the stream of spent gases from the engine as gains access to it.

When the destination is reached, the animal, already dead, is disposed of.

We claim as our invention:

1. In a motor-driven vehicle the combination with the internal combustion engine which drives the vehicle of a chamber with a door in its wall borne by the vehicle, the exhaust pipe from the engine opening into the chamber.

2. A dog-catcher's wagon provided with an internal-combustion driving engine and with a chamber for an animal to be conveyed, the exhaust pipe from the engine opening into said chamber.

In testimony whereof we have hereunto set our hands.

ROBERT KENNINGTON.
ROBERT S. SHEARN.